UNITED STATES PATENT OFFICE.

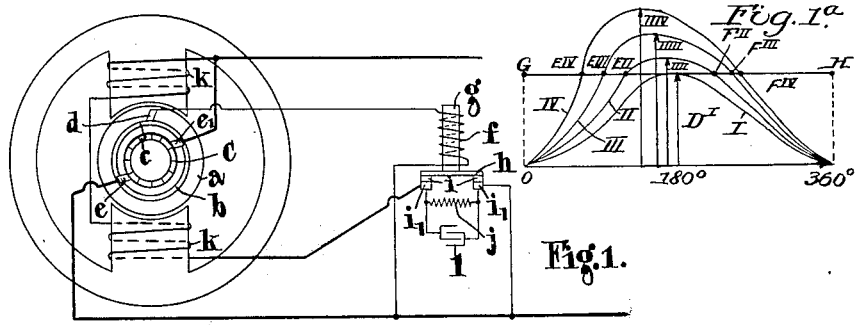
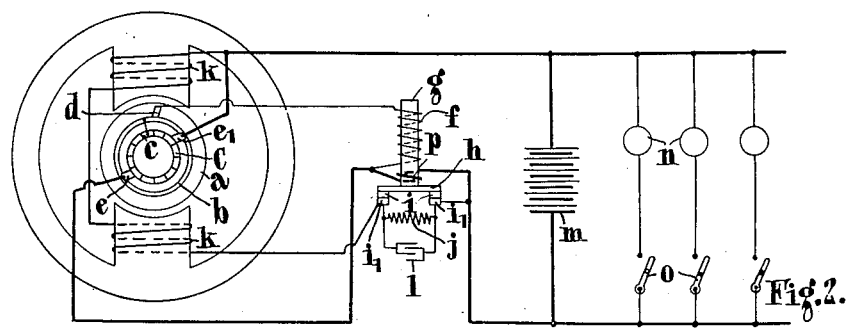
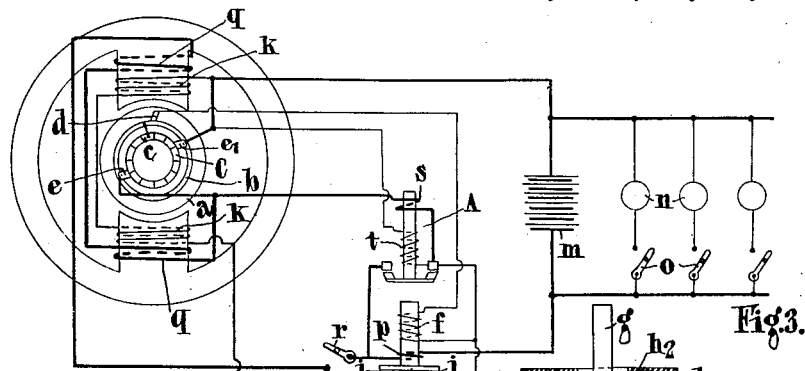
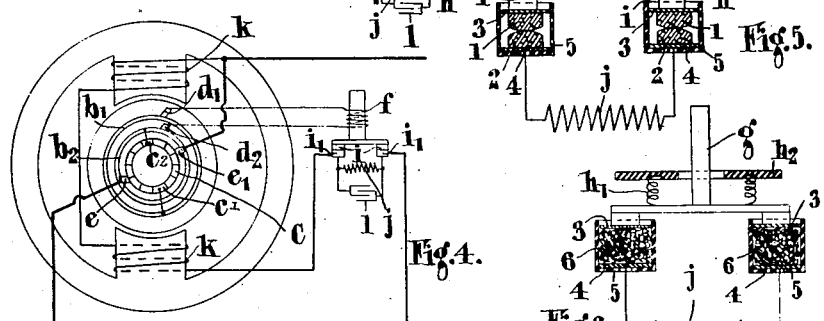
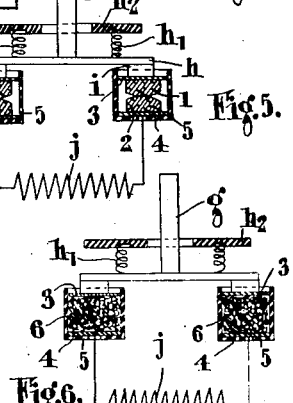

ALBERT HENRY MIDGLEY AND CHARLES ANTHONY VANDERVELL, OF ACTON VALE, ENGLAND.

REGULATION OF DYNAMO-ELECTRIC MACHINES.

1,174,338.     Specification of Letters Patent.     Patented Mar. 7, 1916.

Application filed October 10, 1913. Serial No. 794,522.

*To all whom it may concern:*

Be it known that we, ALBERT HENRY MIDGLEY and CHARLES ANTHONY VANDERVELL, both subjects of the King of Great Britain and Ireland, and both residing at Warple Way, Acton Vale, in the county of Middlesex, England, have invented certain new and useful Improvements in and Relating to the Regulation of Dynamo-Electric Machines, of which the following is a specification.

This invention relates to improvements in the regulation of dynamo electric machines and more particularly of dynamo machines used on motor cars, motor boats and the like which are driven by internal combustion engines.

One object of the invention is to provide a machine in which an approximately constant voltage is maintained independently of variations in speed—the machine having more particularly the characteristics of a shunt dynamo—another object of the invention being to prevent the generation of an excessive current when charging the battery, and the overcharging of the battery when the same is fully charged.

A further object of the invention is to arrange a machine of the kind having series and shunt windings in such a manner that the series winding may be used for starting purposes only, and that the current flowing through the shunt winding shall be reduced to a minimum at the instant of starting, such current gradually increasing with the speed until the machine runs as a compound wound motor.

The invention consists in making the field excitation dependent upon the unidirectional or alternating pulsations of a current derived in the form of such pulsations directly from the machine to be regulated as hereinafter more particularly referred to.

The invention also consists in the arrangements hereinafter more particularly referred to for regulating dynamo electric machines.

The invention is illustrated diagrammatically and by way of example in the accompanying drawings, in which—

Figures 1 to 4 illustrate four different arrangements for carrying out the invention, Fig 1ª is a diagram, and Figs. 5 and 6 illustrate some details.

Referring to the diagram illustrated in Fig. 1ª, I is the potential curve obtained around the commutator between one of the fixed brushes and an exploring brush when the machine is running at its normal speed, while II, III and IV are potential curves obtained in the same manner as the curve I at different increased speeds. These curves show the following relative characteristic features:—(a) The maximum potentials $D_I$, $D_{II}$, $D_{III}$, and $D_{IV}$ corresponding to the curves I, II, III, and IV depend upon the speed of the machine, the potential being greater when the speed is greater. (b) The interval during which the curves II, III and IV, show a potential greater than the maximum potential $D_I$ of the curve I depends upon the speed, it being longer when the speed is greater. Compare $E_{II}$ $F_{II}$ with $E_{III}$ $F_{III}$ and with $E_{IV}$ $F_{IV}$. (c) The ratio between the interval each of the curves II, III and IV is above $D_I$ and the interval each of these curves is below $D_I$ increases with increase of speed. Compare $$\frac{F_{II} F_{II}}{GE_{II}+F_{II}H} \text{ with } \frac{E_{III} F_{III}}{GE_{III}+F_{III}H} \text{ and with } \frac{E_{IV} F_{IV}}{GE_{IV}+F_{IV}H}$$

The essence of the invention consists in arranging a vibrating contact or variable pressure resistance in the field circuit of the machine, and controlling its variations by means of a current of pulsating potential derived from the armature of the machine and possessing the features above referred to. It will be seen that if the vibrating contact is so arranged as to become operative only for potentials greater than $D_I$, the ratio between the time during which the same is open to the time during which it is closed, increases with increase of speed (see Fig. 1ª) whereby the required regulation of the field is effected.

Referring to the arrangement shown in Fig. 1 the armature $a$ of an ordinary shunt wound dynamo is provided with a slip ring $b$ electrically connected with one segment $c$ of the commutator C, the current being collected from this slip ring by means of a brush $d$, which is connected with one of the main brushes $e$ $e_1$ on the commutator, viz., with the brush $e$, through the intermediary of a regulator comprising a solenoid $f$ provided with a core $g$ and an armature $h$ having contacts $i$ adapted to form a variable resistance with the stationary contacts $i_1$, and to short circuit a resistance $j$ connected in series with the shunt field windings $k$ of the dynamo. A condenser $l$ is preferably arranged across the contacts and parallel to the said resistance to be short circuited, in order to prevent sparking. By this arrangement we obtain a pulsating unidirectional current flowing through the solenoid $f$ of the regulator when the dynamo is rotated, the number of pulsations of the current and the strength of the solenoid $f$ increasing in direct proportion with the speed of the dynamo. The armature $h$ is caused to vibrate and its number of vibrations which depends upon the number of pulsations of the current passing through the solenoid $f$ is, therefore, made dependent upon the speed of the machine, and can consequently be utilized for the purpose of making the regulation dependent upon the speed of the latter. The contact resistance of the contacts $i$ and $i_1$ varies according to the speed of the machine because of the ratio between the time pressure is exerted upon the contacts and the time such pressure is released, varying with varying speed in accordance with the explanation hereinbefore referred to (see Fig. 1$^a$). The resistance of the field circuit is varied accordingly, the decrease of the current flowing through the shunt windings $k$ of the dynamo being the greater the greater the speed.

According to the arrangement illustrated in Fig. 2 and adapted to be used more especially in connection with a battery of accumulators $m$ arranged in parallel with the dynamo and with lamps $n$ provided with switches $o$, the regulator hereinbefore described is provided in addition to the solenoid $f$ arranged as in Fig. 1 between one of the main brushes, viz., the brush $e$, and the brush $d$ on the slip ring, with another winding $p$ which is arranged between the dynamo and the battery of accumulators, so that the current from the dynamo to the battery passes through this second solenoid. In this arrangement when the dynamo is charging the battery, the second solenoid $p$, of the regulator acts in the same sense as the first solenoid $f$, thereby tending to reduce the voltage of the dynamo and preventing an excessive current passing through the battery. As the charge and back pressure of the battery increase the current from the dynamo gradually decreases until practically no current passes through the battery, the voltage then being again kept constant only by the first solenoid $f$, and over-charging of the battery being thereby prevented.

According to a modification, illustrated in Fig. 3, the arrangement illustrated in Fig. 2 is used in connection with a dynamo having series and shunt windings, $q$ and $k$ respectively, and in which the series windings $q$ are used for starting purposes only. The series excitation windings $q$, are connected in series with the second winding $p$ of the regulator and with the battery through a hand operated switch $r$. In this modified arrangement the very strong current taken from the battery to start the machine as a motor and passing through the second winding $p$, of the regulator becomes much greater than the current passing through the first solenoid $f$, which during starting acts in opposition to the solenoid $p$ and attracts the armature $h$ to such an extent that the maximum resistance is inserted in the circuit of the shunt excitation, the machine now having the characteristics of a series motor; however, as the speed increases and the current taken from the battery decreases, the current flowing through the series winding $p$ of the regulator decreases and since also the voltage of the machine (now back pressure of the motor) is not so high as when the machine runs as a generator, the solenoid $f$ allows the armature $h$ of the regulator gradually to come down and short circuit the resistance $j$, thereby gradually increasing the shunt excitation current and when the engine starts to work under its own power the machine now acting as a generator attains its voltage the switch $r$ being now opened.

The modification illustrated in Fig. 3 is also provided with an automatic cut-out device A provided with two solenoids $s$ and $t$, the solenoid $s$ being controlled by the current flowing in the circuit between the dynamo and the battery and the solenoid $t$ by the voltage of the dynamo and of the battery.

Instead of operating the regulator by means of a uni-directional pulsating current in the manner hereinbefore described, the same may be operated by means of an alternating current derived from two slip rings provided on the commutator. This modification is illustrated in Fig. 4, which is similar to the arrangement illustrated in Fig. 1, except that the ends of the solenoid $f$ are connected to the brushes $d_1$ and $d_2$ on the slip rings $b_1$ and $b_2$ respectively instead of being connected to a brush on a slip ring and a brush on the commutator segments. The slip rings $b_1$ and $b_2$ are electrically connected to two diametrically opposite commutator segments $c_1$ and $c_2$ respectively. It will be seen that also in this form of construction, if the vibrating contact is so arranged as to become operative only for potentials greater than $D_1$, the ratio between the time when the same is open, to the time during which it is closed, increases with increase of speed (see Fig. 1$^a$) whereby the required regulation of the field is effected.

The variable resistance above referred to may be formed of carbon blocks or carbon granules arranged in such a manner as to lie under the influence of the vibrating armature, which is pressed against said resistance by means of a spring or weight, the current flowing through the solenoid being such as to act in opposition to the spring, thereby allowing the pressure to be decreased, and the resistance to be increased, as the speed of the machine is increased. Such modifications are illustrated in Figs. 5 and 6 in which the vibrating armature $h$ attached to the core $g$ and lying under the influence of springs $h_1$ arranged between the armature and a stationary abutment plate $h_2$, is pressed with its contacts $i$ against the variable resistance. In Fig. 5 the variable resistance is formed by two blocks of carbon 1 and 2 secured to contact plates 3 and 4 respectively and mounted in a cup 5 of insulating material, while in Fig. 6 said variable resistance is formed by carbon granules 6 placed in the cup 5 between the two contact plates 3 and 4.

Having now described our invention, what we claim as new and desire to secure by Letters Patent is:—

1. A regulating arrangement for dynamo electric machines comprising in combination with a continuous current dynamo having an armature winding, a commutator, main brushes, and a field excitation circuit, regulating means in the field excitation circuit, electromagnetic means for controlling said regulating means, and means for supplying a pulsating current from the armature winding of said continuous current dynamo to said electromagnetic means, as set forth.

2. A regulating arrangement for dynamo electric machines, comprising in combination with a continuous current dynamo having an armature winding, a commutator, main brushes, and a field excitation circuit, regulating means in the field excitation circuit, a slip ring connected to a point in the armature winding, an auxiliary brush on the slip ring and electromagnetic means responsive to the voltage between the auxiliary brush and one of the main brushes for controlling said regulating means, as set forth.

3. A regulating arrangement for dynamo electric machines comprising in combination a dynamo having field excitation windings, an armature, a commutator provided with commutator segments and with brushes thereon, a slip ring, a connection between the slip ring and one of the commutator segments, a brush on the slip ring, and a connection between the brush on the slip ring and one of the brushes on the commutator segments, an electromagnet having a winding in the connection between the slip ring and one of the brushes on the commutator segments, an armature under the control of said electro-magnet, contacts on said armature, and stationary contacts arranged opposite the contacts on the armature, and forming therewith a variable pressure resistance, the latter being arranged to lie in series with the field excitation windings of the dynamo, as and for the purposes set forth.

In testimony whereof we have signed our names to this specification in the presence of two subscribing witnesses.

ALBERT HENRY MIDGLEY.
CHARLES ANTHONY VANDERVELL.

Witnesses:
BERTRAM H. MATTHEWS,
P. A. OUTHWAITE.